Figure 1:
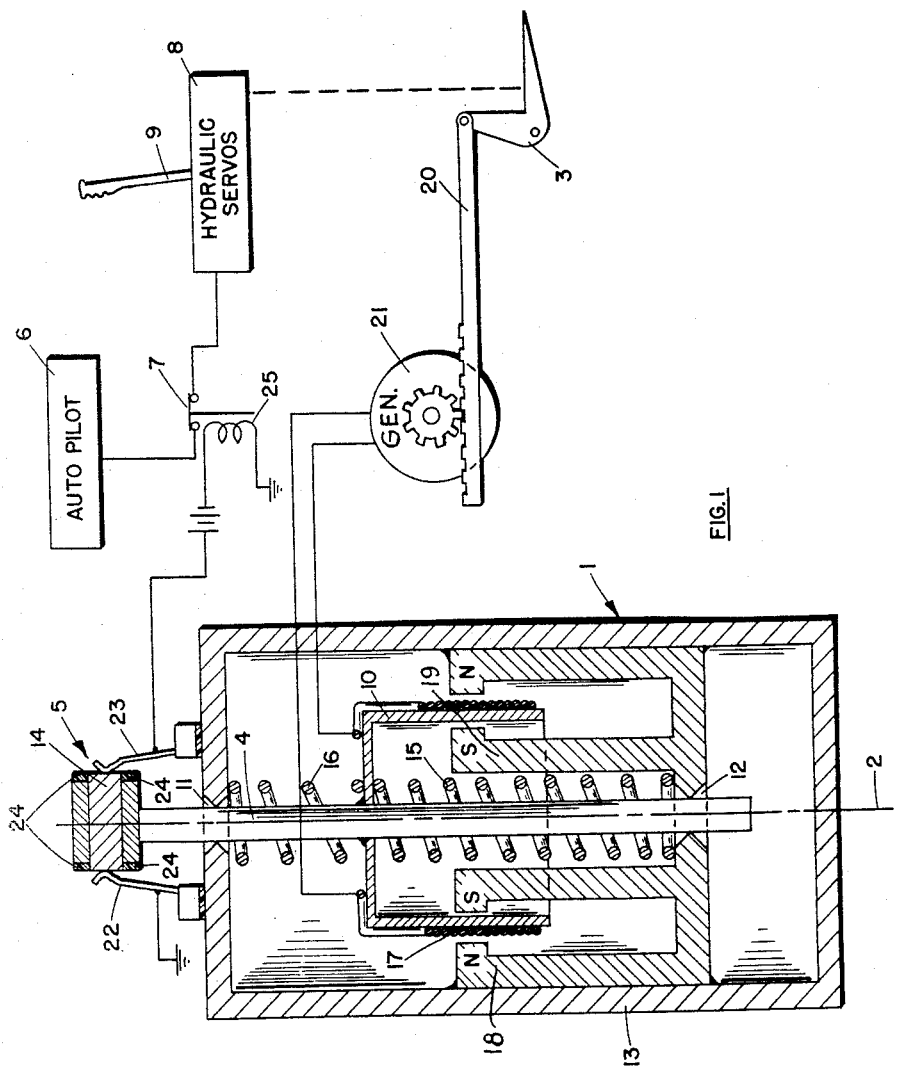

INVENTOR.
ELLIOTT R. BUXTON

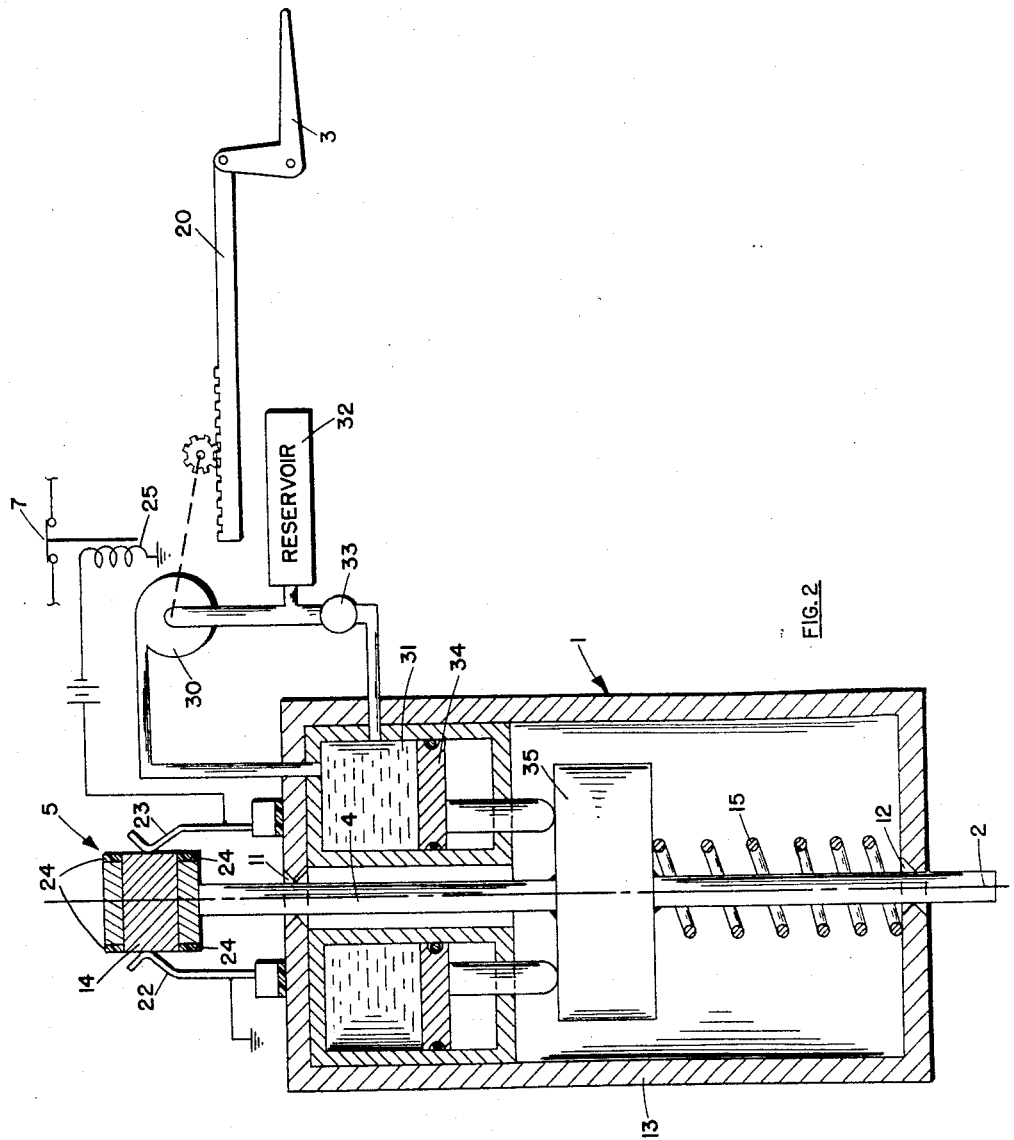

United States Patent Office 2,879,958
Patented Mar. 31, 1959

2,879,958

ACCELERATION ANTICIPATION SWITCH

Elliott R. Buxton, Downey, Calif., assignor to North American Aviation, Inc.

Application January 31, 1956, Serial No. 562,475

6 Claims. (Cl. 244—76)

This invention relates to acceleration anticipation switches, and particularly to an acceleration anticipation switch useful for automatically disconnecting the autopilot on an aircraft when the normal acceleration exceeds a predetermined magnitude.

Modern military aircraft utilizes powered control surface actuation systems. This presents problems concerning flight safety during manual and autopilot controlled flight. Thus, a modern aircraft is equipped with hydraulic-powered irreversible servos on all control surfaces. These servos are controlled either by an autopilot or by manual operation of the control stick. Usually two independent hydraulic systems are incorporated in a particular aircraft. The first and primary system is called the "normal" system, and this is the system which is used predominantly. The second or "alternate" system is available in case of a failure of the normal system. As long as the normal system is operating properly in response to the normal outputs of the autopilot, the aircraft operates in a desired manner. It is frequently desirable to incorporate a safety device into the aircraft which protects against malfunction of the autopilot-hydraulic system, particularly in the positioning of the elevators of the aircraft. This safety device is important to insure against the aircraft being guided by the autopilot into maneuvers causing greater stresses than can be withstood by the airframe.

The most severe conditions to be guarded against occur during high speed flights at comparatively low altitudes. In a typical aircraft operating at a speed of Mach 0.85 at 12,000 feet altitude, it can be shown analytically that an autopilot failure of the type causing a maximum elevation deflection rate produces an excessive load factor build-up on the airframe unless a switching from autopilot to normal-manual hydraulic control is initiated less than 0.12 second after the faliure. It is to be noted, however, that the actual normal acceleration at the end of this length of time may be as small as 0.16 G at the center of gravity. This is too small a change in actual normal acceleration to be accurately detected with sufficient reliability by a purely acceleration sensitive switch. Larger G's are experienced at the nose of the aircraft under the same conditions. However, moderate gusts and average landings would also cause inadvertent actuation of a switch positioned in the nose and sensitive only to acceleration. Therefore, since a switch sensitive only to accelerations is comparatively unreliable, it is the purpose of this invention to provide an acceleration anticipation switch sensitive both to the normal acceleration and to a function of the anticipated change in the normal acceleration of the aircraft.

It is therefore an object of this invention to provide an improved acceleration anticipation switch sensitive to the normal acceleration of an aircraft and to a function of the rate of change of position of the elevators of the aircraft.

It is another object of this invention to provide an acceleration anticipation switch for an aircraft including a mass positioned in the aircraft in a manner to move in response to forces and accelerations along a predetermined axis; means for generating a force on this mass along the preselected axis proportional to the anticipated change of acceleration along said axis; and switching means responsive to the movement of the mass.

It is a further object of this invention to provide an improved acceleration anticipation switch useful for disconnecting a malfunctioning autopilot from the control system of an aircraft when excessive normal accelerations are present or anticipated, comprising a mass supported in said aircraft in a manner to move in response to normal accelerations of said aircraft; force generating means having a force output proportional to the rate of movement of the elevators of said aircraft; means subjecting said mass to the force output of the force generating means in the direction of movement of said mass; and switching means responsive to a preselected magnitude of movement of said mass in a manner to disconnect said autopilot from said hydraulic system after movement of said mass by said preselected magnitude.

Other objects of this invention will become apparent from the following description taken in connection with the accompanying drawings, in which Fig. 1 is a schematic view of a preferred embodiment of the acceleration anticipation switch contemplated by this invention;

And Fig. 2 is a schematic drawing of an alternate embodiment of the acceleration anticipation switch contemplated by this invention.

Referring now to Fig. 1, acceleration anticipation switch 1 provides a linear mechanical movement proportional to the sum of the normal acceleration of the aircraft along axis 2 and the deflection rate of aircraft elevators 3. Normal acceleration may be defined for the purposes of this invention as the acceleration of the aircraft along an axis perpendicular to the horizontal plane of the aircraft. Circuit continuity between the autopilot and the hydraulic servo system is broken by the excessive movement of plunger 4, thereby opening switches 5 and 7.

In normal operation, autopilot 6 produces guidance signals which are coupled through switch 7 to hydraulic servos 8. Hydraulic servos 8 are also responsive to the movement of control stick 9 which may be used by the pilot to override the autopilot. The pilot may also optionally disconnect the autopilot from servos 8 by actuating a switch (not shown) and thereafter control the aircraft maneuvers by control stick 9. The hydraulic servos actuate the control surfaces of the aircraft in a manner well-known to those skilled in the art and need not be further described here. If the autopilot produces signals indicating a desired rate of climb or dive, hydraulic servos 8 actuate elevator 3 to move to a new position corresponding to the desired rate of climb or dive. After a finite period of time, the aircraft responds to the new position of the elevator surfaces and accomplishes the desired maneuver.

Plunger 4 of switch 1 has a finite mass which includes the weight of aluminum cup 10 and a portion of switch 5. This mass is slideably supported in the aircraft by means of bearings 11 and 12 of casing 13. Casing 13 is attached to the airframe (not shown) in a manner to orient axis 2 normal to the horizontal plane of the aircraft, preferably at or near the center of gravity. When the aircraft is subjected to normal acceleration, whether due to the positioning of elevators 3 or to other causes, plunger 4 with cup 10 and switch 5 is subjected to a linear force along axis 2. This force causes a movement of plunger 4 until it is balanced by an equal and opposite force from restraining springs 15 and 16. Restraining springs 15 and 16 are made strong enough to limit the movement of plunger 4 under normal operating conditions to a comparatively small magnitude insufficient to break the contact of switch 5.

Plunger 4 is also subjected to an electromagnetic force from coil 17 and permanent magnets 18 and 19 when elevator 3 is being moved to a new position. The movement of elevator 3 results in a corresponding movement of lever 20, which movement is in turn detected by D.-C. generator 21. Therefore, generator 21 produces a D.-C. voltage output proportional to the rate of rotation of elevator 3. This D.-C. potential is connected across coil 17 causing a current to flow therein. The current flowing in coil 17, when subjected to the magnetic fields of magnets 18 and 19, results in a force being exerted on plunger 4 in a manner well-known to those skilled in the art. This force is proportional to the anticipated change of acceleration which would normally be expected from such a rate of change of position of elevator 3.

If the autopilot is malfunctioning and the called-for or anticipated change in acceleration when added algebraically to the acceleration already being experienced along axis 2 exceeds the design capabilities of the aircraft, plunger 4 is displaced against the actions of springs 15 and 16 a sufficiently large amount to break the contact of switch 5. It is to be noted that this movement of plunger 4 is not merely proportional to the present normal acceleration of the aircraft but is also a function of the anticipated acceleration, which results after a finite time from the movement of elevator 3. When contact arms 22 and 23 make contact with insulated segments 24, switch 5 is opened, de-energizing coil 25. Switch 7 thereupon opens. Autopilot 6 is disconnected from hydraulic servos 8, and the pilot must assume control of the aircraft by utilizing control stick 9.

Referring now to Fig. 2, an alternate embodiment of the acceleration anticipation switch contemplated by this invention is shown. In this embodiment, the electromagnetic forces proportional to the anticipated change in normal acceleration of the aircraft are replaced by hydraulic forces utilizing pump 30 driven by the movement of lever 20. Pump 30 conveys a hydraulic fluid to sealed chamber 31 in switch 1 and back to reservoir 32 through restrictive orifice 33. The pressure in chamber 31 is proportional to the speed of rotation of pump 30. Piston 34 is responsive to the pressure of the hydraulic fluid in chamber 31 to exert a force on block 35 which in turn is attached to plunger 4. Plunger 4 is therefore subjected to a force proportional to the rate of change of position of elevator 3. Plunger 4 and switch 5 respond to this hydraulic force as well as to the normal acceleration force in the manner previously described with respect to Fig. 1.

As has been noted previously, the acceleration anticipation switch of this invention is sensitive not only to the actual normal acceleration present in the aircraft but is also sensitive to a future acceleration indicated by the movement of the elevators. The movement of the elevators precedes any actual change in acceleration by a finite time. The switch therefore anticipates a future normal acceleration, and if this future acceleration exceeds the design limits of the aircraft, the switch disconnects the autopilot before damage to the aircraft. It is to be noted that switches which are sensitive only to present normal accelerations must be set far below the allowable limits of normal acceleration. This is necessary since although the present normal acceleration may be far below the design limits, the autopilot may have positioned the elevators in such a position that even though a switch similar to switch 7 is now opened, the transient acceleration will become excessive after a finite time. The acceleration anticipation switch of this invention does not have this disadvantage since it is also sensitive to future accelerations.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An acceleration anticipation switch for an aircraft comprising a mass positioned in said aircraft in a manner to move in response to accelerations along a preselected axis; means for generating a force on said mass along said axis proportional to an anticipated change of acceleration along said axis; and switching means responsive to the movement of said mass.

2. An acceleration anticipation switch for an aircraft sensitive to the aircraft normal accelerations and anticipated changes in said normal accelerations comprising a mass in said aircraft positioned to move in response to said aircraft normal accelerations; means for exerting a force on said mass proportional to the rate of change of position of the elevators of said aircraft; and switching means responsive to the movement of said mass.

3. An acceleration anticipation switch for an aircraft comprising a mass positioned in said aircraft in a manner to move in response to accelerations along a preselected axis; means for generating an electric signal proportional to an anticipated change of acceleration along said preselected axis; means responsive to the output of said signal generating means for exerting a force on said mass along said pre-selected axis proportional to said rate of change of acceleration; and switching means responsive to the movement of said mass.

4. An acceleration anticipation switch for an aircraft sensitive to the aircraft normal acceleration and to an anticipated change of said acceleration comprising a mass spring-suspended in said aircraft and positioned to move against said springs in response to said aircraft normal accelerations; signal generating means having a signal output proportional to the angular velocity of the elevator surfaces of said aircraft; means for generating a magnetic field normal to the vertical axis of said aircraft; a coil operatively associated with said mass and positioned in said magnetic field; means subjecting said coil to said signal output of said signal generating means, the force on said mass resulting from the reaction between said coil and said magnetic field having a direction corresponding to the direction of the anticipated change in acceleration of said aircraft resulting from movement of said elevator surfaces; and switch means responsive to the movement of said mass.

5. An acceleration anticipation switch for an aircraft, said switch being sensitive to the normal acceleration of said aircraft measured along an axis normal to the horizontal plane of said aircraft and to anticipated changes in said normal acceleration of said aircraft comprising a mass supported in said aircraft in a manner to have freedom of motion only along an axis normal to the horizontal plane of said aircraft; spring means positioned to restrain the movement of said mass along said axis; signal generating means responsive to the rotation of the elevators of said aircraft and having a signal output proportional to the angular velocity of said elevators; means responsive to the signal output of said signal generating means for subjecting said mass to a force having a magnitude proportional to the angular velocity of said elevators and a direction determined by the direction of rotation of said elevators; and switch means responsive to the movement of said mass along said axis.

6. An acceleration anticipation switch for a vehicle comprising a mass positioned in said vehicle in a manner to move in response to accelerations along a preselected axis, means for detecting anticipated changes of acceleration along said axis, means responsive to said detecting means for exerting a force on said mass along said axis, and switch means responsive to the movement of said mass.

References Cited in the file of this patent

UNITED STATES PATENTS

| | | |
|---|---|---|
| 2,137,974 | Fischel | Nov. 22, 1938 |
| 2,776,829 | Cockram | Jan. 8, 1957 |